United States Patent [19]

Iguma

[11] Patent Number: 4,568,142

[45] Date of Patent: Feb. 4, 1986

[54] OBJECTIVE LENS DRIVE APPARATUS

[75] Inventor: Akira Iguma, Toyokawa, Japan

[73] Assignee: Hitachi, Ltd., Tokyo, Japan

[21] Appl. No.: 488,452

[22] Filed: Apr. 25, 1983

[30] Foreign Application Priority Data

Apr. 26, 1982 [JP] Japan ............................. 57-59697[U]
Apr. 28, 1982 [JP] Japan ............................. 57-61258[U]

[51] Int. Cl.⁴ .......................... G02B 27/17; G02B 7/02
[52] U.S. Cl. ........................................ 350/6.3; 350/255
[58] Field of Search ................................ 350/6.3, 255

[56] References Cited

U.S. PATENT DOCUMENTS 1,953,805  8/1929  Hegel ..................................... 74/108
4,473,274  9/1984  Yano et al. ............................. 350/6.3

Primary Examiner—John K. Corbin
Assistant Examiner—David Lewis
Attorney, Agent, or Firm—Antonelli, Terry & Wands

[57] ABSTRACT

In an objective lens drive apparatus for driving a body to be driven including an objective lenses in the focusing direction along the optical axis and in the tracking direction perpendicular to the optical axis, there is provided an adjuster for allowing the center of a driving force exerted on the body in the tracking direction to coincide with the center of gravity of the body or to shift the center of gravity farther away from the objective lenses from the driving force along the optical axis of the objective lenses.

14 Claims, 7 Drawing Figures

OBJECTIVE LENS DRIVE APPARATUS

This invention relates to an objective lens drive apparatus for reading information optically recorded on a recording medium, and particularly to an objective lens drive apparatus for driving a body to be driven including an objective lens along the optical axis and in the direction perpendicular to the optical axis.

In the optical reproducing apparatus using laser light, the laser light is focused by a lens on a very small spot, thereby detecting signals. In order to correctly detect signals, it is necessary to perform the focusing control by which the light spot is always focused on the information recording medium even if the information recording medium has an irregular surface or vibrates and the tracking control by which the light spot is allowed to always follow correct signal tracks. In addition, when timing error is caused by irregular rotation of the information recorded medium, control must be made to correct for the error. Such control needs an error detector for detecting each error and an actuator for moving the optical system so as to cancel the error.

For this reason, there is used a known apparatus having provided a so-called voice coil in a body to be driven including the objective lens, so as to be movable along the optical axis and mirrors with rotative axes perpendicular to each other in the light path leading to the object lens, these mirrors being rotated to reflect light in two directions both perpendicular to the optical axis so that the light is focused in three directions independently. However, this apparatus needs an objective lens of large angle of view, resulting in the large apparatus.

In order to remove the above disadvantage, there is proposed a method in which an optical system using an object lens of small angle of view is supported by an elastic support member such as a plate spring and vibrated in the optical-axis direction and in the direction perpendicular to the optical axis by applying a proper electrical signal. In the apparatus in which such objective lens is driven two-dimensionally, the means for driving the objective lens may be achieved by using an electromagnet, voice coil pair, piezoelectric element, or others. It is necessary for the means to be small and of light weight in order to have good response to focusing and tracking operation.

We now consider an objective lens drive apparatus particularly employing a coil on a body to be driven, including an objective lens and a magnetic circuit using an electromagnet on the drive side thereby to perform tracking control and focusing control by one magnetic circuit. In this objective lens drive apparatus, the objective lens is fixed to the tip end of the body at its disc side to be driven. The objective lens is heavy, and the center of gravity of the body to be driven is shifted in its position toward the disc side, or objective lens side along the optical axis of the objective lens away from the center of the driving force exerted on the body to be driven in the tracking direction. Particularly in the CD player for the compact disc of 12 cm in diameter, the spot diameter on the disc, $\lambda/NA$ ($\lambda$: wavelength, NA: numerical aperture) is required to be 1.75 μm or below as a standard. To meet this requirement, the value of NA must be as large as 0.45 to 0.5. Thus, the objective lens is formed of three or four lens elements. The lens surface nearest to the disc must be physically separated by a working distance of about 1.5 mm to 2.0 mm from the disc. Consequently, the three or four objective lens elements are provided at the end of the mirror cylinder closer to the disc. This follows that the center of gravity of the body to be driven including the objective lenses is positioned towards the disc, or the object lens side away from the center of the body. In other words, the center of the driving force exerted on the body is shifted toward the opposite to the disc, or the opposite to the objective lens along the optical axis of the objective lens away from the center of gravity of the body. In such objective lens drive apparatus, there is a disadvantage that when the body is driven in the tracking direction, unnecessary rolling as inclination occurs at a specific frequency of drive current, preventing tracking error correction.

Accordingly, it is an object of this invention to provide an objective lens drive apparatus with no such disadvantage, of which the objective lens can be moved correctly in response to the tracking error signal and which is small and of light weight.

The feature of this invention is that the center of the driving force exerted on a body to be driven including an objective lens is made coincident with the center of gravity of the body to be driven or is shifted toward the disc side or objective lens side along the optical axis of the objective lens.

This invention will become more readily understood from the following exemplary description taken with the accompanying drawings, wherein.

Figure 1:
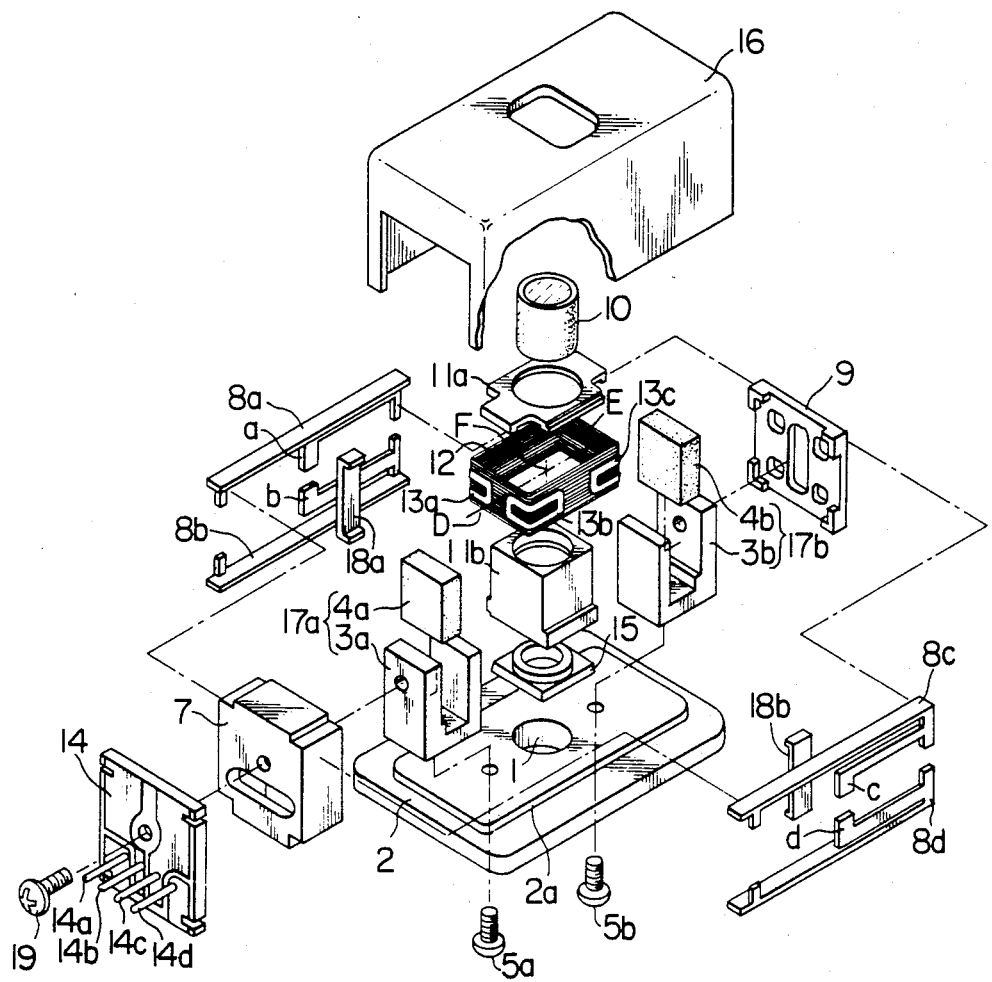
FIG. 1 is an exploded diagram of an objective lens drive apparatus of this invention.
Figure 4:
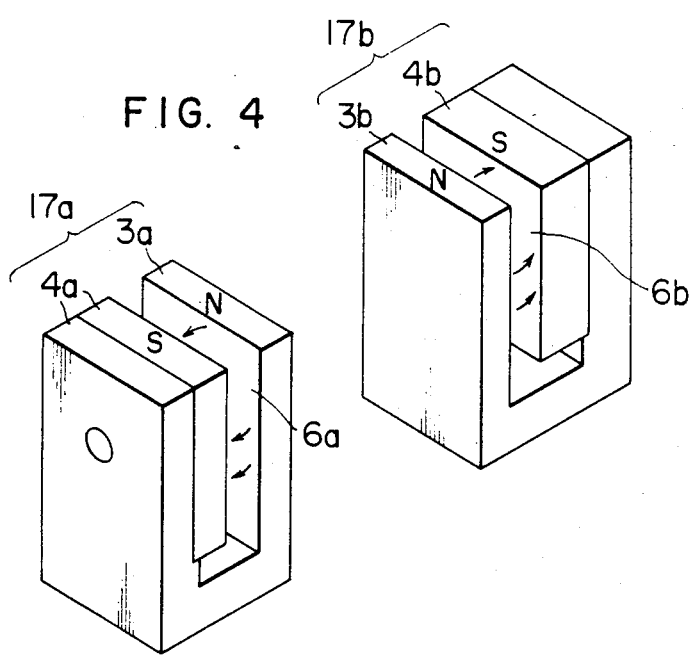
FIG. 4 is a perspective view of a magnetic circuit member.

Referring to FIG. 1, there are shown a base 2 having an aperture 1 at its center and made of diecast material, and magnetic circuit members 17a and 17b comprising yoke plates 3a and 3b, and rectangular parallelepiped magnets 4a and 4b magnetized in the width direction i.e., in a direction perpendicular to the optical axis. The rectangular magnets have a longer length in the direction of the optical axis and the magnetic circuit members have a sufficient length so that the tracking coil is within the range of the plane of the magnetic circuit members even if the tracking coil moves in the direction of the optical axis for focusing. These magnetic circuit members 17a and 17b are securely mounted to the base 2 by setscrews 5a and 5b so that the same magnetic poles are opposed as shown in FIG. 4. The polarities of the magnetic circuit members 17a and 17b and the direction of magnetic lines of force are shown in FIG. 4. The magnetic flux is produced in the arrow direction in air gaps 6a and 6b.

On the yoke plate 3a of the magnetic circuit member 17a are provided a support frame 7 and a terminal plate 14 which are used as a fixed end for support springs 8a to 8d in such a manner that one ends of the horizontal portions of the support springs 8a to 8d are bonded to the four corners of the frame 7 and plate 14 with adhesive. The other ends of the support springs 8a to 8d are bonded to the four corners of a movable frame 9 with adhesive.

Figure 2:
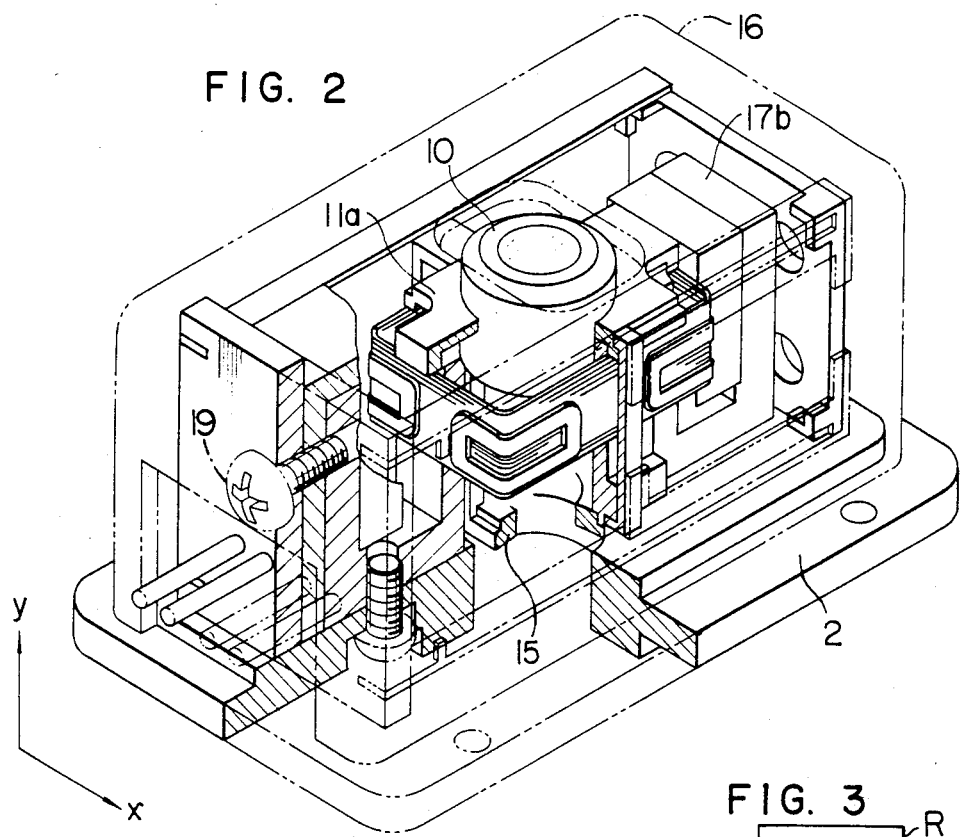
FIG. 2 is a partial cross-sectional perspective view of the objective lens drive apparatus.

A mirror cylinder 10 in which an objective lens is incorporated is securely bonded with adhesive to lens frame 11a and 11b which are securely bonded to each other with adhesive. A square-shaped focusing coil 12 is securely bonded with adhesive to the outsides of the square-shaped lens frame 11b, and tracking coils 13a to 13d are securely bonded with adhesive on the four corners of the focusing coil 12. Particularly, as shown in FIGS. 1 and 2, suspension holders 18a and 18b are securely bonded with adhesive to the lens frames 11a and 11b above and below the focusing coil 12. To the suspension holders 18a and 18b are securely bonded with adhesive free ends a, b, c and d of the vertical portions of the support springs 8a to 8d in FIG. 1. The other ends of the vertical portions of the support springs 8a and 8b are integrally formed with the horizontal portions, respectively and securely bonded with adhesive to the movable frame 9. The four tracking coils 13a to 3d are connected in series, and the opposed ends thereof are soldered to the free ends a and b of the vertical portions of the support springs 8a and 8b. An optical scanning device disclosed in the co-pending U.S. Application Ser. No. 340,701 filed on Jan. 1, 182 and assigned to the present assignee comprises the focusing and tracking coils. The opposite ends of the focusing coil 12 are soldered to the free ends of the vertical portions of the support springs 8c and 8d. Thus, the coils 13a to 13d and 12 are electrically connected via the plate spring 8a to 8d to the terminal plate 14 and then via the copper foil side to terminals 14a, 14b and 14c, 14d respectively. This terminal plate 14 is fixed to the base 1 together with the support frame 7, by setscrew 19 or the like.

Thus, the coils 12 and 13a to 13d are placed in the air gaps 6a and 6b shown in FIG. 4. When current is flowed in the focusing coil 12, the coil 12 is displaced in the y-direction, and when the current is flowed in the tracking coils 13a to 13d, the coils 13a to 13d are displaced in the x-direction shown in FIG. 2.

Figure 3:
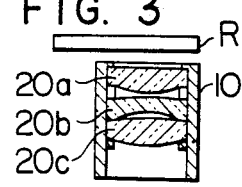
FIG. 3 is a cross-sectional diagram of a mirror cylinder.

The mirror cylinder 10, as shown in FIG. 3, has three objective lens elements 20a to 20c arranged and fixed in the end portion on the disc side (upper side) in relation to disc R. Thus, a body to be driven, formed of the mirror cylinder 10, lens frames 11a and 11b and coils 12 and 13a to 13d as shown in FIG. 1 has its center of gravity position deviated to the objective lens 20a to 20c-sided within the mirror cylinder 10. The center of the driving force exerted on this body to be driven in the tracking direction is, however, on the center of the vertical portions of the tracking coils 13a to 13d, i.e., an imaginary plane including line DE across the coils 12. It is at point F in the optical-axis direction of the objective lenses. The center of gravity of the body to be driven is deviated to the upper side from the point F. Thus, in this invention, a weight 15 having at its center a window through which light flux can be passed is securely bonded with adhesive to the lower end of the lens frame 11b below the mirror cylinder 10. This weight 15 is effective to lower the center of gravity of the driven body itself so as to allow the center of gravity, in the optical-axis direction to coincide with the center of the driving force F exerted on the driven body in the tracking direction, or allow the center of gravity to be brought to the upper side, or disc side, or the objective lens side. This weight 15 is made of a nonmagnetic material such as brass or aluminum. The free ends a to d of the support springs 8a to 8d are equidistant from the center F of the driving force in the tracking direction. In the condition that the setscrew 19 is not tightened, in other words, in the condition that the body to be driven, 10 to 13 is fixed only to the support springs 8a to 8d and support frame 9, the weight 15 can readily be fixed to the lens frame 11b in accordance with the design of the shape and weight of the objective lens.

As illustrated, a cover 16 is provided for the objective lens drive apparatus according to this invention. This cover 16 is securely bonded with adhesive to the step 2a of the base 2.

Figure 5:
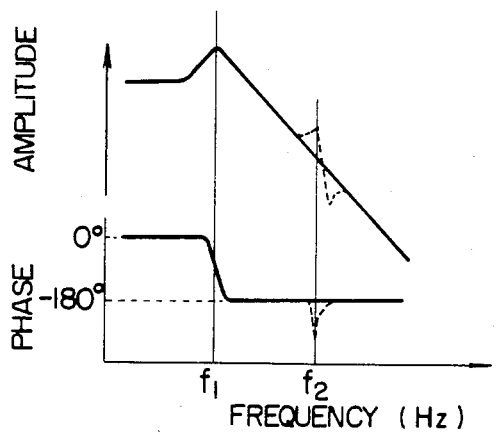
FIG. 5 is a graph of vibration frequency characteristics.

FIG. 5 shows a graph of the tracking-direction vibration vs. frequency characteristic of the objective lens drive apparatus according to this invention. Drive current flows in the tracking coils 13a to 13d, thereby causing the body including the objective lens to be moved in the tracking direction. In FIG. 5, the abscissa shows the frequency of the drive current and the ordinate the relative displacement of the amplitude of the vibration for the upper curve, and the phase of the vibration for the lower curve. The amplitude and the phase correspond to a real and an imaginary part of the vibration of the body, respectively. In addition, $f_1$ represents the lowest resonant frequency determined by the rigidity of the support springs 8a to 8d and the mass of the body to be driven, 10 to 13, and $f_2$ is the rolling frequency equal to several times the frequency $f_1$.

Figure 6A:
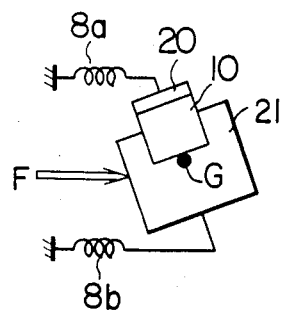
FIG. 6 is an explanatory diagram useful for explaining the driving of a body in the tracking direction.
Figure 6B:
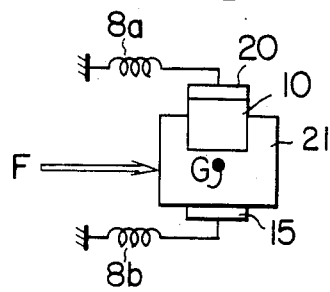
Figure 6C:
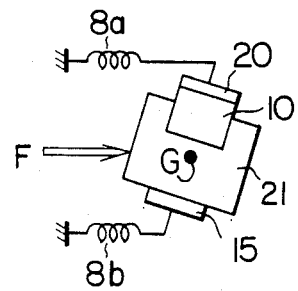

FIGS. 6A to 6C show the body driven by the driving force F in the tracking-direction. The lens frames 11 and the coils 12 and 13a to 13d are represented as a box 21 in FIGS. 6A to 6C.

Referring to FIG. 6a, when the driving force F in the tracking-direction is applied to the body 10, the body and the objective lens are inclined and shifted away from the disc track. The driving force is provided on the basis of the tracking error signal in the tracking servo system. Thus, the spot irradiated on the disc through the objective lens is not on the desired track of the disc. The broken line in FIG. 5 shows this case where the weight 15 according to this invention is not provided. At frequency $f_2$ the optical axis of the objective lens is inclined in the direction opposite to the driving force F, or in the direction in which the body 10 to 13 departs away from the disc track. When the phase is shifted more than 180 degrees as indicated by the broken line, the tracking control circuit oscillates at frequency $f_2$ so that control at frequency $f_2$ is impossible. Thus, in the prior art, tracking control cannot be achieved correctly. In this invention, when the weight 15 is provided to make the center of gravity G coincident with the driving force F exerted in the tracking direction as shown in FIG. 6B, the amplitude displacement becomes as shown by solid curve in FIG. 5 so that the phase delay is held at 180 degrees at frequency $f_1$ resulting in correct tracking control. When the weight 15 is increased to shift the center of gravity, G to be lower than the driving force F as shown in FIG. 6C, i.e., to position the center of gravity farther away than the driving force from the objective lens elements 20a–20c, the optical axis of the objective lens is inclined in the direction of the driving force F so that the phase delay does not exceed 180 degrees, resulting in correct tracking control.

Figure 7A:
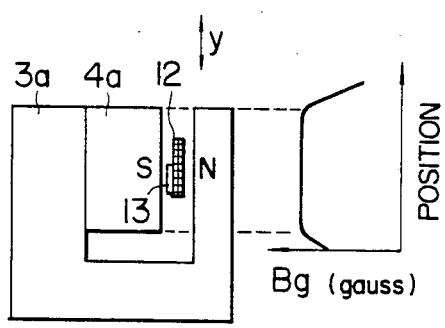
FIG. 7 is an explanatory diagram useful for explaining the magnetic circuit member.
Figure 7B:
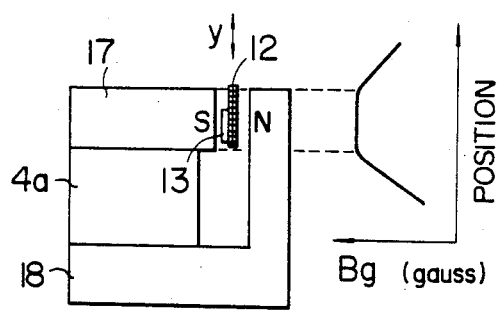

FIGS. 7A and 7B show the structure of the magnetic circuit member and its distribution to magnetic field in the optical-axis direction. FIG. 7B shows a magnetic circuit arrangement disclosed in the co-pending U.S.

Application Ser. No. 340,701 filed on Jan. 19, 1982. In the embodiment of FIG. 7A, the magnets 4a and 4b are surrounded by the U-shaped yoke plates 3a and 3b and magnetized in the transverse or horizontal direction perpendicular to y-direction. In FIG. 4, the magnetic circuit members 17a and 17b are arranged symmetrically with respect to the optical axis, with the same polarities opposed. One surface of the magnets is a magnetic pole for providing magnetic flux, causing to widen the portion of the uniform magnetic field. Since the number of junctions between the yoke plates 3a, 3b and magnets 4a, 4b is halved as compared with the case of FIG. 7B, it is possible to reduce such junctions.

Although the yoke plates 3a and 3b can be formed by cutting work, they can be formed at low cost with high precision by powder sintered alloy or drawing so that the yoke plate is a powder sintered alloy member or a drawn member.

According to this invention, even if the objective lens is displaced in the optical-axis direction, the driving force in the direction perpendicular to the optical axis is good in linearity because the coils for driving the objective lens vertically to the optical axis are within a uniform magnetic field. Moreover, since the yoke plates of the magnetic circuit members are integrally formed, the first and second yokes 17 and 18 shown in FIG. 7B are not necessary with the result that the number of parts to be used is reduced. This leads to small size and low cost.

I claim:

1. An objective lens drive apparatus comprising:
   a mirror cylinder for mounting on one end thereof at least one objective lens having an optical axis;
   focusing coil means and tracking coil means secured to said mirror cylinder at a portion surrounding said mirror cylinder;
   magnetic circuit means disposed so as to provide magnetic fields for said focusing coil means and tracking coil means;
   elastic supporting means for elastically supporting said mirror cylinder for enabling movement of said mirror cylinder in at least one of a tracking and focusing direction when at least one of said focusing coil means and tracking coil means is supplied with driving current; and
   weight means mounted on the other end of said mirror cylinder for adjusting a center of gravity of a body to be driven including said mirror cylinder, said tracking coil means and said focusing coil means, so that the center of gravity of the body to be driven one of coincides with a center of a driving force exerted on said body in the tracking direction and is positioned farther away from said at least one objective lens than the center of the driving force, thereby enabling correct tracking control.

2. An objective lens drive apparatus according to claim 1, wherein said weight means positions the center of gravity of said body along the optical axis of said at least one objective lens.

3. An objective lens drive apparatus according to claim 1, wherein said weight means comprises a member of non-magnetic material.

4. An objective lens drive apparatus according to claim 1, wherein said weight means comprises a member of brass.

5. An objective lens drive apparatus according to claim 1, wherein said weight means comprises a member of aluminum.

6. An objective lens drive apparatus according to claim 1, wherein said weight means comprises a member having an aperture for enabling light flux to pass therethrough along the optical axis.

7. An objective lens drive apparatus according to claim 1, wherein said weight means comprises a member of non-magnetic material having an aperture for enabling light flux to pass therethrough.

8. An objective lens drive apparatus according to claim 1, wherein said weight means comprises a member of brass having an aperture for enabling light flux to pass therethrough.

9. An objective lens drive apparatus according to claim 1, wherein said weight means comprises a member of aluminum having an aperture for enabling light flux to pass therethrough.

10. An objective lens drive apparatus according to claim 1, wherein said elastic supporting means comprises at least one support spring for displacement in the focusing direction and the tracking direction, each portion of said support spring for displacement in the tracking direction being positioned at approximately equal distance from the center of the driving force exerted in the tracking direction.

11. An objective lens drive apparatus according to claim 1, wherein said magnetic circuit means include at least one rectangular shaped magnet having a length extending in the direction of the optical axis which is longer than the length of the adjacent sides thereof, the magnet being magnetized in a direction perpendicular to the optical axis direction.

12. An objective lens drive apparatus according to claim 1, wherein said magnetic circuit means includes a yoke plate surrounding a rectangular-shaped magnet.

13. An objective lens drive apparatus according to claim 12, wherein said yoke plate is a powder sintered alloy member.

14. An objective lens drive apparatus according to claim 12, wherein said yoke plate is a drawn member.

* * * * *